United States Patent
Yu et al.

(10) Patent No.: US 10,053,916 B2
(45) Date of Patent: Aug. 21, 2018

(54) NOZZLE ASSEMBLIES INCLUDING SHAPE MEMORY MATERIALS FOR EARTH-BORING TOOLS AND RELATED METHODS

(71) Applicant: Baker Hughes Incorporated, Houston, TX (US)

(72) Inventors: Bo Yu, Spring, TX (US); James Andy Oxford, Magnolia, TX (US); Juan Miguel Bilen, The Woodlands, TX (US); Eric C. Sullivan, Houston, TX (US); Wanjun Cao, The Woodlands, TX (US); Xu Huang, Spring, TX (US); John H. Stevens, The Woodlands, TX (US); Chris Perez, Porter, TX (US)

(73) Assignee: Baker Hughes Incorporated, Houston, TX (US)

( * ) Notice: Subject to any disclaimer, the term of this patent is extended or adjusted under 35 U.S.C. 154(b) by 303 days.

(21) Appl. No.: 15/002,189

(22) Filed: Jan. 20, 2016

(65) Prior Publication Data
US 2017/0204675 A1 Jul. 20, 2017

(51) Int. Cl.
*E21B 10/60* (2006.01)
*C22F 1/00* (2006.01)
(Continued)

(52) U.S. Cl.
CPC .............. *E21B 10/60* (2013.01); *B23K 31/02* (2013.01); *C22F 1/006* (2013.01); *E21B 10/61* (2013.01);
(Continued)

(58) Field of Classification Search
CPC ... B23K 2201/002; B23K 31/02; C22F 1/006; E21B 10/60; E21B 10/61; E21B 2010/607; F16B 1/0014
See application file for complete search history.

(56) References Cited

U.S. PATENT DOCUMENTS 4,281,841 A * 8/1981 Kim ........................ B23P 11/02
277/607
4,582,149 A 4/1986 Slaughter, Jr.
(Continued)

FOREIGN PATENT DOCUMENTS

JP 10068284 A 3/1998
WO 2014055089 A1 4/2014
(Continued)

OTHER PUBLICATIONS

International Search Report for International Application No. PCT/US2017/013764 dated Apr. 27, 2017, 3 pages.
(Continued)

*Primary Examiner* — James G Sayre
(74) *Attorney, Agent, or Firm* — TraskBritt

(57) ABSTRACT

An earth-boring tool includes a tool body having an aperture therein defining a nozzle port, a nozzle or nozzle assembly disposed in the nozzle port, and a shape memory material disposed adjacent a surface of at least one component of the nozzle or nozzle assembly. The shape memory material retains at least one component of the nozzle or nozzle assembly by a threadless connection. The threadless connection includes mechanical interference between the shape memory material, the at least one component of the nozzle or nozzle assembly, and the tool body or another component of the nozzle or nozzle assembly. The shape memory material is formulated and configured to transform from a first phase and a first shape upon heating and to transform from a second phase and a second shape upon cooling.

20 Claims, 9 Drawing Sheets

(51) Int. Cl.
*B23K 31/02* (2006.01)
*E21B 10/61* (2006.01)
*B23K 101/00* (2006.01)

(52) U.S. Cl.
CPC ... *B23K 2201/002* (2013.01); *E21B 2010/607* (2013.01)

(56) References Cited

U.S. PATENT DOCUMENTS

| | | | |
|---|---|---|---|
| 4,619,320 | A | 10/1986 | Adnyana et al. |
| 4,700,790 | A | 10/1987 | Shirley |
| 4,776,412 | A | 10/1988 | Thompson |
| 4,794,995 | A | 1/1989 | Matson et al. |
| 4,840,346 | A | 6/1989 | Adnyana et al. |
| 5,199,497 | A | 4/1993 | Ross |
| 5,380,068 | A | 1/1995 | Raghavan |
| 5,494,124 | A | 2/1996 | Dove et al. |
| 5,536,126 | A | 7/1996 | Gross |
| 5,632,349 | A | 5/1997 | Dove et al. |
| 5,653,298 | A | 8/1997 | Dove et al. |
| 5,718,531 | A | 2/1998 | Mutschler, Jr. et al. |
| 5,906,245 | A * | 5/1999 | Tibbitts .............. E21B 10/5673 175/426 |
| 6,062,315 | A | 5/2000 | Reinhardt |
| 6,311,793 | B1 | 11/2001 | Larsen et al. |
| 6,321,845 | B1 | 11/2001 | Deaton |
| 6,388,043 | B1 | 5/2002 | Langer et al. |
| 6,433,991 | B1 | 8/2002 | Deaton et al. |
| 6,742,585 | B1 | 6/2004 | Braithwaite et al. |
| 6,779,602 | B1 | 8/2004 | Van Bilderbeek et al. |
| 6,786,557 | B2 | 9/2004 | Montgomery, Jr. |
| 7,270,188 | B2 | 9/2007 | Cook et al. |
| 7,275,601 | B2 | 10/2007 | Cook et al. |
| 7,299,881 | B2 | 11/2007 | Cook et al. |
| 7,357,190 | B2 | 4/2008 | Cook et al. |
| 7,954,568 | B2 | 6/2011 | Bilen |
| 8,011,456 | B2 | 9/2011 | Sherwood, Jr. |
| 8,141,665 | B2 | 3/2012 | Ganz |
| 8,201,648 | B2 | 6/2012 | Choe et al. |
| 8,376,065 | B2 | 2/2013 | Teodorescu et al. |
| 8,381,844 | B2 | 2/2013 | Matthews, III et al. |
| 8,496,076 | B2 | 7/2013 | DiGiovanni et al. |
| 8,579,052 | B2 | 11/2013 | DiGiovanni et al. |
| 8,727,042 | B2 | 5/2014 | DiGiovanni |
| 8,997,897 | B2 | 4/2015 | De Reynal |
| 9,091,132 | B1 | 7/2015 | Cooley et al. |
| 2004/0069540 | A1 | 4/2004 | Kriesels et al. |
| 2004/0155125 | A1 | 8/2004 | Kramer et al. |
| 2004/0194970 | A1 | 10/2004 | Eatwell et al. |
| 2006/0048936 | A1 | 3/2006 | Fripp et al. |
| 2006/0266557 | A1 * | 11/2006 | Estes ...................... E21B 10/18 175/340 |
| 2007/0227775 | A1 | 10/2007 | Ma et al. |
| 2008/0236899 | A1 | 10/2008 | Oxford et al. |
| 2009/0139727 | A1 | 6/2009 | Tanju et al. |
| 2009/0205833 | A1 | 8/2009 | Bunnell et al. |
| 2009/0321145 | A1 | 12/2009 | Fisher et al. |
| 2010/0071956 | A1 | 3/2010 | Beuershausen |
| 2010/0132957 | A1 | 6/2010 | Joseph et al. |
| 2010/0187018 | A1 | 7/2010 | Choe et al. |
| 2010/0314176 | A1 | 12/2010 | Zhang et al. |
| 2011/0031025 | A1 | 2/2011 | Kulkarni et al. |
| 2011/0146265 | A1 | 6/2011 | Joseph et al. |
| 2012/0255784 | A1 | 10/2012 | Hanford |
| 2012/0312599 | A1 | 12/2012 | Trinh et al. |
| 2014/0216827 | A1 | 8/2014 | Zhang et al. |
| 2014/0374167 | A1 | 12/2014 | Mueller et al. |
| 2015/0152723 | A1 | 6/2015 | Hay |
| 2015/0218889 | A1 | 8/2015 | Carroll et al. |

FOREIGN PATENT DOCUMENTS

| | | |
|---|---|---|
| WO | 2015088508 A1 | 6/2015 |
| WO | 2015195244 A1 | 12/2015 |
| WO | 2016057076 A1 | 4/2016 |

OTHER PUBLICATIONS

International Written Opinion for International Application No. PCT/US2017/013764 dated Apr. 27, 2017, 11 pages.

* cited by examiner

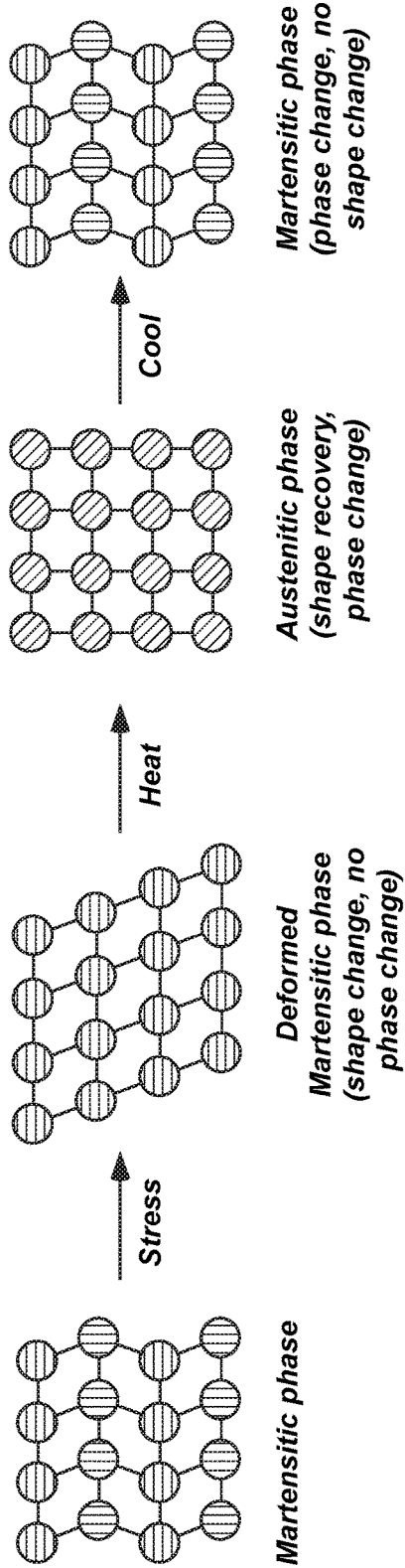
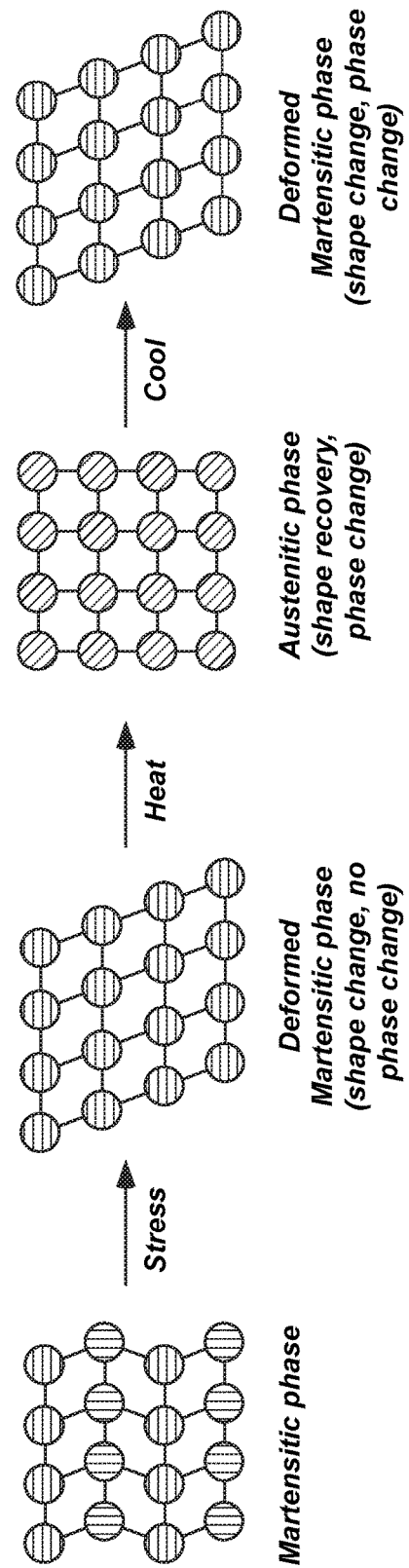
FIG. 5A
FIG. 5B

NOZZLE ASSEMBLIES INCLUDING SHAPE MEMORY MATERIALS FOR EARTH-BORING TOOLS AND RELATED METHODS

CROSS-REFERENCE TO RELATED APPLICATIONS

The subject matter of this application is related to the subject matter of U.S. patent application Ser. No. 15/002,230, filed Jan. 20, 2016, and titled "Earth-Boring Tools, Depth-of-Cut Limiters, and Methods of Forming or Servicing a Wellbore," and U.S. patent application Ser. No. 15/002,211, filed Jan. 20, 2016, and titled "Earth-Boring Tools and Methods for Forming Earth-Boring Tools Using Shape Memory Materials," the entire disclosure of each of which is hereby incorporated herein by this reference.

TECHNICAL FIELD

The present disclosure relates to methods of securing nozzle assemblies, nozzles, nozzle sleeves, and fluid inlet tubes in position on a tool body of an earth-boring tool using shape memory materials, and to earth-boring tools formed by such methods.

BACKGROUND

Subterranean drilling operations generally employ a rotary drill bit that is rotated while being advanced through rock formations. Cutting elements or structures affixed to the rotary drill bit cut the rock while drilling fluid removes formation debris and carries it back to the surface. The drilling fluid is pumped from the surface through the drill string and out through one or more (usually a plurality of) nozzles located on the drill bit. The nozzles direct jets or streams of the drilling fluid to clean and cool cutting surfaces of the drill bit and for the aforementioned debris removal.

The number of nozzles on the drill bit depends on the bit size and the arrangement of the cutting elements on the face of the individual drill bit. Accordingly, the total flow area of the nozzles is determined by first evaluating the requirements of hydraulics for the particular drilling application. Moreover, the life of a drill bit having PDC cutting elements is typically extended when it is adequately lubricated and cooled during the drilling process. In contrast, having inadequate fluid flow to the face of a drill bit allows formation cuttings to collect on the faces of the cutting elements. This collection of cuttings isolates the cutting elements from the drilling fluid. This also reduces the rate of penetration of the drill bit and if the debris collection is sufficiently high the cutting elements may overheat which increases the wear rate.

Examples of nozzles for delivering drilling fluids include: U.S. Pat. No. 4,776,412 to Thompson; U.S. Pat. No. 4,794,995 to Matson, et al.; U.S. Pat. No. 5,380,068 to Raghaven; U.S. Pat. Nos. 5,494,124, 5,632,349, and 5,653,298 to Dove et al.; U.S. Pat. No. 6,311,793 to Larsen et al.; U.S. Patent Application No. 2004/0155125 A1 to Kramer et al.; and U.S. Patent Application No. 2004/0069540 A1 to Kriesels.

BRIEF SUMMARY

In some embodiments, an earth-boring tool for use in forming a wellbore within a subterranean formation comprises a tool body having an aperture therein defining a nozzle port, a nozzle or nozzle assembly disposed in the nozzle port, and at least one shape memory material disposed adjacent a surface of at least one component of the nozzle or nozzle assembly and retaining the at least one component in position on the earth-boring tool by a threadless connection. The nozzle port extends between an internal fluid plenum within the tool body and an external surface of the tool body. The threadless connection comprises mechanical interference between the at least one shape memory material, the at least one component of the nozzle or nozzle assembly, and the tool body or another component of the nozzle or nozzle assembly.

A method of an earth-boring tool for use in forming a wellbore within a subterranean formation comprises disposing a nozzle or a nozzle assembly in a nozzle port of a tool body of the earth-boring tool. The nozzle port is defined by an aperture in the tool body extending between an internal fluid plenum within the tool body and an external surface of the tool body. At least one shape memory material is disposed adjacent a surface of at least one component of the nozzle or nozzle assembly. The at least one shape memory material is transformed from a first phase to a second phase by a stimulus. The at least one shape memory material is formulated and configured to retain at least one component of the nozzle or the nozzle assembly by a threadless connection in the second phase. The threadless connection comprises mechanical interference between the at least one shape memory material, the at least one component of the nozzle or nozzle assembly, and the tool body or another component of the nozzle or nozzle assembly.

BRIEF DESCRIPTION OF THE DRAWINGS

While the specification concludes with claims particularly pointing out and distinctly claiming what are regarded as embodiments of the present disclosure, various features and advantages of the disclosure may be more readily ascertained from the following description of example embodiments of the disclosure when read in conjunction with the accompanying drawings, in which:

FIGS. 5A and 5B are simplified diagrams illustrating how the crystal structure of a shape memory material may change;

DETAILED DESCRIPTION

The illustrations presented herein are not meant to be actual views of any particular component, device, or system, but are merely idealized representations which are employed to describe embodiments of the present invention.

As used herein, the term "and/or" includes any and all combinations of one or more of the associated listed items.

Figure 1:
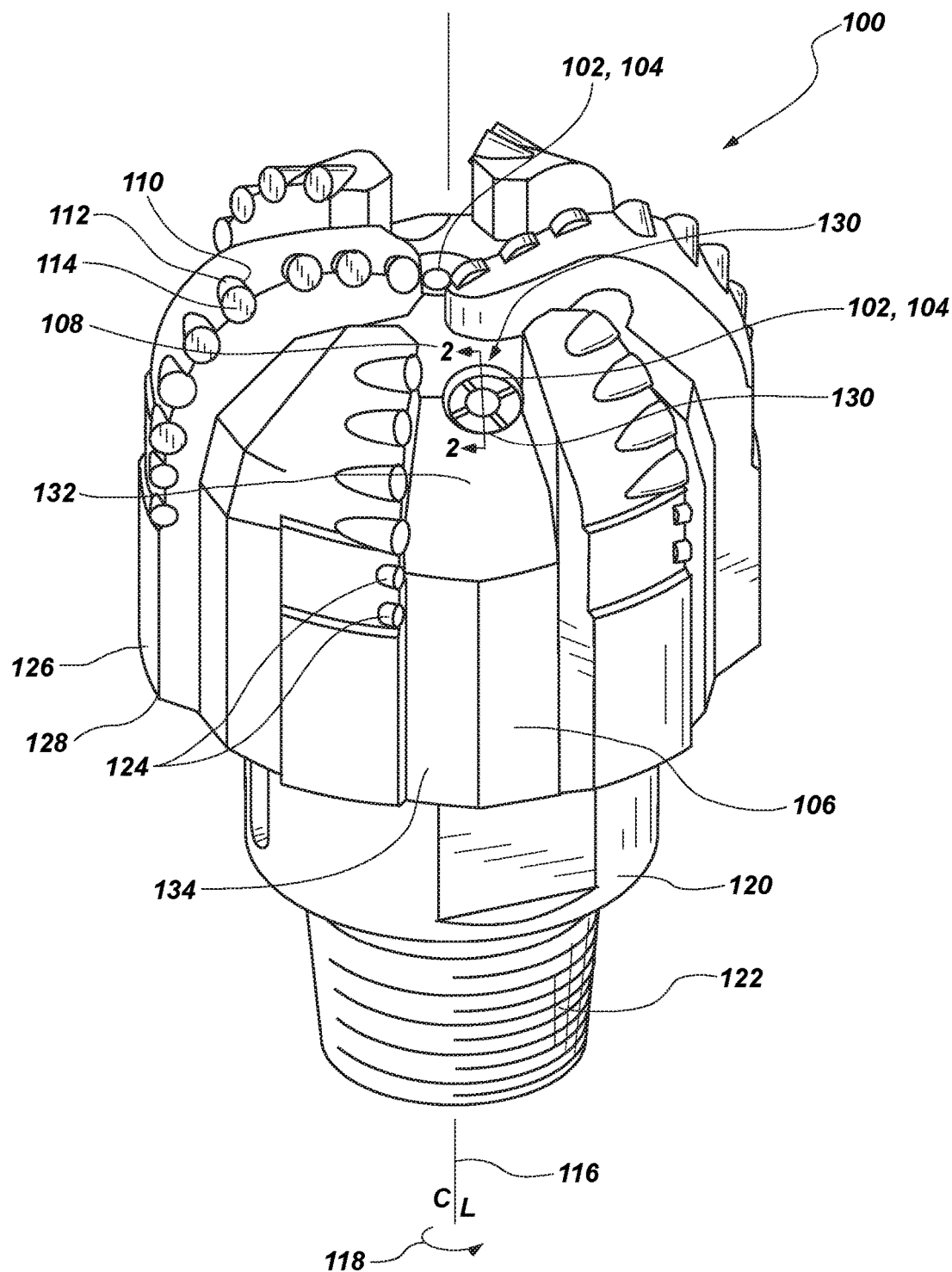
FIG. 1 illustrates an earth-boring rotary drill bit comprising nozzles and nozzle assemblies retained using shape memory materials as described herein.

FIG. 1 illustrates an earth-boring tool for use in fouling a wellbore within a subterranean formation in the form of a fixed-cutter earth-boring rotary drill bit 100 comprising a plurality of nozzles 102 and/or nozzle assemblies 104 as described herein. Other types of earth-boring tools, such as roller cone bits, percussion bits, hybrid bits, reamers, etc., also may comprise a plurality of nozzles 102 and/or nozzle assemblies 104 as described herein. The drill bit 100 may be a matrix body drill bit or a steel body drill bit. The drill bit 100 may comprise a tool body 106 having an external surface 108 with a plurality of cutting elements 110 mounted thereon. The cutting elements 110 may be, for example, polycrystalline diamond cutters (often referred to as "PDCs") comprising a supporting substrate 112 having a polycrystalline diamond material 114 thereon. The cutting elements 110 may be positioned to cut a subterranean formation being drilled while the drill bit 100 is rotated under weight-on-bit (WOB) in the wellbore about a longitudinal axis 116 in a direction indicated by arrow 118. A shank 120 may comprise external threading 122 for coupling the drill bit 100 to a drill string. The tool body 106 may comprise gage trimmers 124 and pads 126 on a gage 128 thereof. During drilling, drilling fluid may be discharged through nozzles 102 and/or nozzles assemblies 104 disposed in nozzle ports 130 in fluid communication with the external surface 108 of the tool body 106 for cooling the cutting elements 110 and removing formation cuttings from the external surface 108 of drill bit 100 into passages 132 and junk slots 134.

Figure 2:
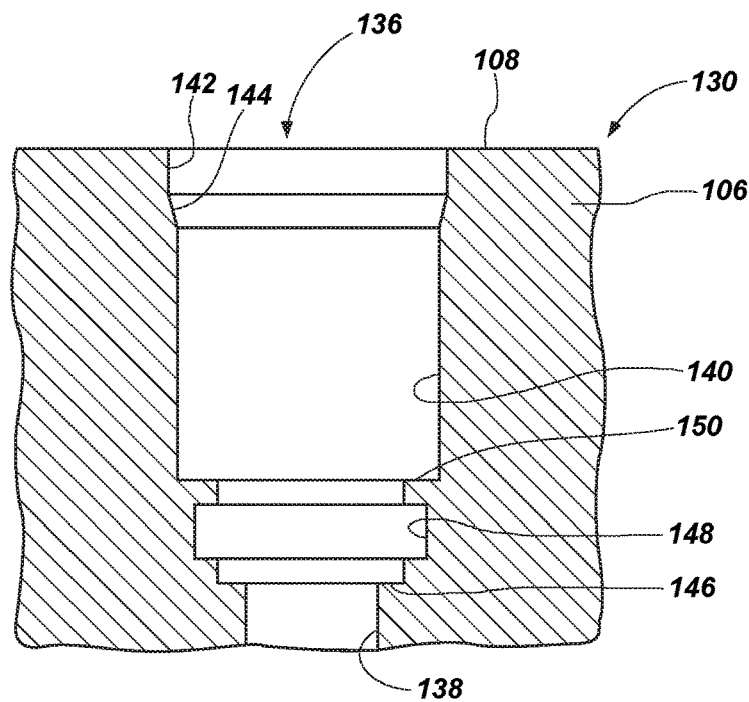
FIG. 2 illustrates a cross-sectional side view of a nozzle port in a tool body according to an embodiment of the present disclosure.
Figure 3:
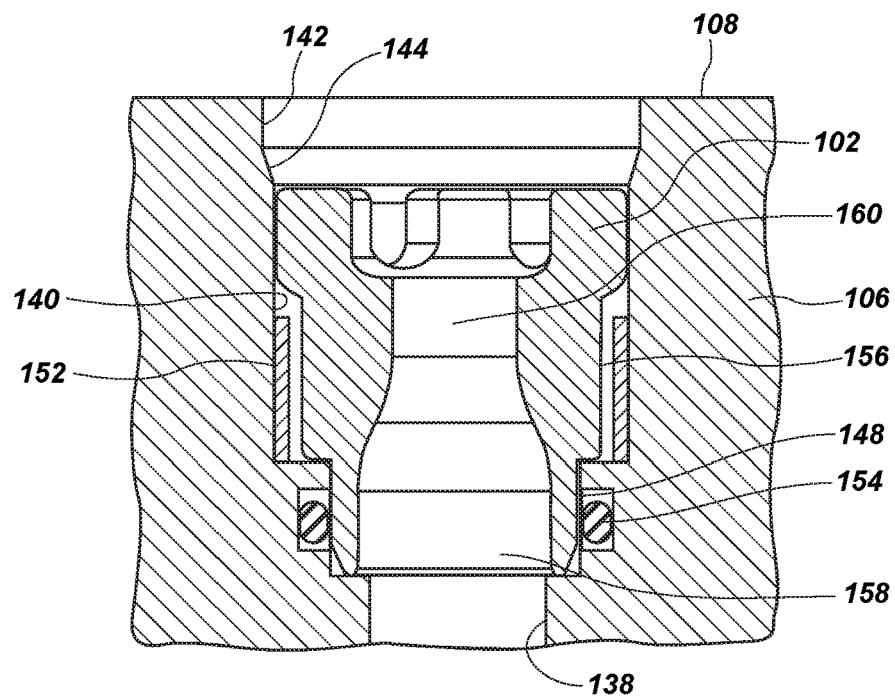
FIG. 3 illustrates a cross-sectional side view of a nozzle and a shape memory material in a first phase disposed in the nozzle port of FIG. 2.

FIG. 2 illustrates a nozzle port 130 of the earth-boring rotary drill bit 100 of FIG. 1, in accordance with an embodiment of the present disclosure. The nozzle port 130 may be defined by an aperture 136 in the tool body 106. The nozzle port 130 may extend between an internal fluid plenum 138 within the tool body 106 and the external surface 108 of the tool body 106. The nozzle port 130 may be sized and configured to receive a nozzle 102 (FIG. 3) therein. In some embodiments, an inner surface 140 of the tool body 106 within the nozzle port 130 may lack internal threading. The nozzle port 130 may comprise within its circumference an exit port 142, a chamfer 144, a shape memory material seat 150, an annular seal groove 148, and a nozzle seat 146. In other embodiments, the annular seal groove 148 may be formed in an outer side surface 156 of the nozzle 102 (FIG. 3). The exit port 142 may be configured to be slightly larger than an outer diameter of the nozzle 102 and an outer diameter of a shape memory material 152 to be disposed about the nozzle 102 to facilitate the installation of the nozzle 102 and the shape memory material 152 therein (FIG. 3). The chamfer 144 further facilitates alignment and placement of the nozzle 102 therein. The shape memory material seat 150 provides a stop for insertion of the shape memory material 152 at a predetermined depth within the tool body 106. The annular seal groove 148 may be configured to receive a seal 154 therein (FIG. 3). The nozzle seat 146 provides a stop for insertion of the nozzle 102 at a predetermined depth within the tool body 106. In other embodiments, the shape memory seat 150 and the annular seal groove 148 may be omitted such that the shape memory material 152 may be disposed at a greater depth within the tool body 106 such as against the nozzle seat 146. In such embodiments, an inner diameter of the nozzle port 130 may be expanded proximate to the nozzle seat 146 to accommodate the nozzle 102 and the shape memory material 152 provided thereon.

Figure 4:
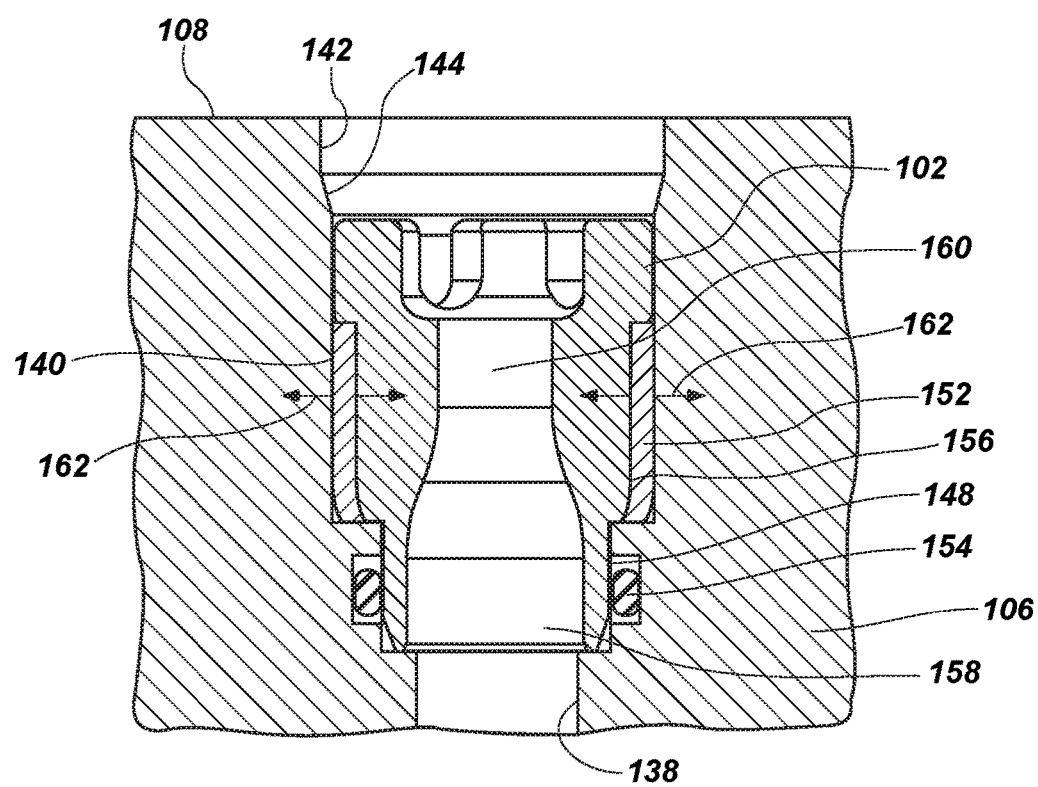
FIG. 4 illustrates a cross-sectional side view of a nozzle disposed in the nozzle port of FIG. 2 and retained by a shape memory material in a second phase.

FIG. 3 illustrates the shape memory material 152 in a first phase disposed between an outer side surface 156 of the nozzle 102 and an inner surface 140 of the tool body 106 within the nozzle port 130 of FIG. 2. FIG. 4 illustrates the shape memory material 152 in a second phase disposed within the nozzle port 130 of FIG. 2. The nozzle 102 may comprise a substantially cylindrical outer side surface 156 and an internal passageway or bore 158 through which drilling fluid flows from the internal fluid plenum 138 and through bore 158 to nozzle orifice 160. In some embodiments, the nozzle 102 lacks a threaded portion on the outer side surface 156 thereof. A seal 154, such as an O-ring seal, may be provided in the annular seal groove 148 and may be sized and configured to be compressed between an outer wall of the annular seal groove 148 and the outer side surface 156 of the nozzle 102 to substantially prevent drilling fluid flow between the nozzle 102 and the inner surface 140 of the tool body 106, while the fluid flows through the nozzle 102. In some embodiments, the shape memory material 152 may be configured to prevent drill fluid flow between the nozzle 102 and the inner surface 104 of the tool body 106 such that the annular seal groove 148 and the seal 154 may be omitted.

With continued reference to FIG. 4, the nozzle 102 may be removably inserted into and retained in the nozzle port 130 by a threadless connection. The threadless connection may comprise mechanical interference between the outer side surface 156 of the nozzle 102, the inner surface 140 of the tool body 106 within the nozzle port 130, and the shape memory material 152. The shape memory material 152 may be inserted into the nozzle port 130 against the shape memory material seat 150 (FIG. 2) prior to insertion of the nozzle 102. The shape memory material 152 may be in the form of an annular sleeve and may concentrically surround the nozzle 102 upon insertion. In other embodiments, the shape memory material 152 may be in the form of at least one annular ring. In some embodiments, one or more annular rings may be disposed around the nozzle 102. In yet other embodiments, the shape memory material 152 may have any other suitable shape.

Upon insertion, the shape memory material 152 may be in the first phase. In the first phase, the shape memory material 152 may have an inner diameter greater than the outer diameter of the nozzle 102 and an outer diameter less than the inner diameter of the nozzle port 130 defined by the inner surface 140 of the tool body 106. To secure and retain the nozzle 102 in the nozzle port 130, a stimulus may be applied to the shape memory material 152 to convert (i.e., transform)

the first phase into the second phase, as described with reference to FIGS. 5A and 5B below. The phase transformation from the first phase to the second phase may result in an enlargement of one or more dimensions of the shape memory material 152. For example, the shape memory material 152 may have a smaller inner diameter, a larger outer diameter, a shorter length, a longer length, or any other selected dimensional difference in the second phase. In some embodiments, the phase transformation from the first phase to the second phase may be a change in shape from a remembered first shape to a remembered second shape. In the second phase, the shape memory material 152 may have a thickness in a range extending from about 0.005 in (0.127 mm) to about 0.5 in (12.7 mm) and, more particularly, from about 0.0625 in (1.5875 mm) to about 0.125 in (3.175 mm).

In the second phase, the shape memory material 152 may exert forces 162 (FIG. 4) on the outer side surface 156 of the nozzle 102 and the inner surface 140 of the tool body 106. The forces 162 provided by the shape memory material 152 may negate the need to use a threaded connection between the nozzle 102 and the nozzle port 130. The magnitude of the forces 162 may vary based on the dimensions of the shape memory material 152 in the second phase and based on the magnitude of the deviation from the dimension of the shape memory material 152 in the first phase.

The shape memory material 152 may be any suitable shape memory material, including shape memory metal alloys and shape memory polymers. Shape memory alloys may include Ni-based alloys, Cu-based alloys, Co-based alloys, Fe-based alloys, Ti-based alloy, Al-based alloys, or any mixture thereof. For example, a shape memory alloy may include a 50:50 mixture by weight of nickel and titanium, a 55:45 mixture by weight of nickel and titanium, or a 60:40 mixture by weight of nickel and titanium. Many other compositions are possible and can be selected based on tool requirements and material properties as known in the art. Shape memory polymers may include, for example, epoxy polymers, thermoset polymers, thermoplastic polymers, or combinations or mixtures thereof. Shape memory materials, and particularly, shape memory alloys are polymorphic and may exhibit two or more crystal structures or phases. Shape memory alloys may further exhibit a shape memory effect associated with the phase transition between two crystal structures or phases, such as austenite and martensite. The austenitic phase exists at elevated temperatures, while the martensitic phase exists at low temperatures. The shape memory effect may be triggered by a stimulus which may be thermal, electrical, magnetic, or chemical, and which causes a transition from one phase to another.

By way of non-limiting example, the element comprising a shape memory alloy may transform from an original austenitic phase (i.e., a high-temperature phase) to a martensitic phase (i.e., a low-temperature phase) upon cooling. The phase transformation from austenite to martensite may be spontaneous, diffusionless, and temperature dependent. The transition temperatures from austenite to martensite and vice versa vary for different shape memory alloy compositions. The phase transformation from austenite to martensite occurs between a first temperature ($M_s$), at which austenite begins to transform to martensite and a second, lower temperature ($M_f$), at which only martensite exists. With reference to FIG. 5A, initially, the crystal structure of martensite is heavily twinned and may be deformed by an applied stress such that the element takes on a new size and/or shape. After the applied stress is removed, the element retains the deformed size and/or shape. However, upon heating, martensite may transform and revert to austenite. The phase transformation occurs between a first temperature ($A_s$) at which martensite begins to transform to austenite and a second, higher temperature ($A_f$) at which only austenite exists. Upon a complete transition to austenite, the element returns to its original "remembered" size and/or shape. As used herein, the term "remembered" refers to a state to which a material returns. Upon a second cooling process and transformation from austenite to martensite, the crystal structure of the martensitic phase is heavily twinned and may be deformed by an applied stress such that the element takes on at least one of a new size and/or shape. The size and/or shape of the element in the previously deformed martensitic phase are not remembered from the initial cooling process. This shape memory effect may be referred to as a one-way shape memory effect, such that the element exhibits the shape memory effect only upon heating as illustrated in FIG. 5A.

Other shape memory alloys possess two-way shape memory, such that the element comprising such a shape memory alloy exhibits this shape memory effect upon heating and cooling. Shape memory alloys possessing two-way shape memory effect may, therefore, include two remembered sizes and shapes—a martensitic (i.e., low-temperature) shape and an austenitic (i.e., high-temperature) shape. Such a two-way shape memory effect is achieved by "training." By way of example and not limitation, the remembered austenitic and martensitic shapes may be created by inducing non-homogeneous plastic strain in a martensitic or austenitic phase, by aging under an applied stress, or by thermomechanical cycling. After a shape memory alloy is trained to exhibit a two-way shape memory effect, heating the shape memory alloy above the second, higher temperature ($A_f$) may cause the shape memory alloy to "forget" the remembered austenitic and martensitic shapes. With reference to FIG. 5B, when a two-way shape memory alloy is cooled from an austenitic to a martensitic phase, some martensite configurations might be favored, so that the material may tend to adopt a preferred shape. By way of further non-limiting example, and without being bound by any particular theory, an applied stress may create permanent defects, such that the deformed crystal structure of the martensitic phase is remembered. After the applied stress is removed, the element retains the deformed size and/or shape. Upon heating, martensite may transform and revert to austenite between the first temperature ($A_s$) and the second, higher temperature ($A_f$). Upon a complete transition to austenite, the element returns to its original remembered size and shape. The heating and cooling procedures may be repeated such that the element transforms repeatedly between the remembered martensitic and the remembered austenitic shapes.

A shape memory polymer may exhibit a similar shape memory effect. Heating and cooling procedures may be used to transition the shape memory polymer between a hard phase and a soft phase by heating the polymer above, for example, a melting point or a glass transition temperature ($T_g$) of the shape memory polymer and cooling the polymer below the melting point or glass transition temperature ($T_g$) as taught in, for example, U.S. Pat. No. 6,388,043, issued May 14, 2002 to Langer et al., the entire disclosure of which is incorporated herein by this reference.

Though discussed herein as having one or two remembered shapes, shape memory materials may have any number of phases, and may be trained to have a selected remembered shape in any or all of the phases.

With reference to FIGS. 3 and 4, the shape memory material 152 may be trained to exhibit a two-way shape memory effect prior to disposing the shape memory material 152 in the nozzle port 130 in some embodiments. The shape memory material 152 may be formulated and configured to retain the nozzle 102 in the nozzle port 130 upon heating the shape memory material 152 to a predetermined second phase transition temperature, such as the second, higher temperature ($A_f$) when the shape memory material 152 comprises a metal alloy. Upon heating the shape memory material 152, the shape memory material 152 may transition to the second phase and the second size and/or shape, as illustrated in FIG. 4. Upon transformation to the second phase, the force 162 may be applied and the nozzle 102 retained in the nozzle port 130. The shape memory material 152 may be configured to release the nozzle 102 upon cooling the shape memory material 152 to a predetermined first phase transition temperature, such as to the second, lower temperature ($M_f$) when the shape memory material 152 comprises a metal alloy. Upon cooling the shape memory material 152, the shape memory material 152 may return to the first phase and the first size and/or shape, as illustrated in FIG. 3. Upon transformation to the first phase, the forces 162 may be removed and the nozzle 102 may be removed.

In other embodiments, the shape memory material 152 may exhibit a one-way shape memory effect. The shape memory material 152 may be disposed in the nozzle port 130 at ambient temperature in a first phase, such as a martensitic phase when the shape memory material 152 comprises a metal alloy. The shape memory material 152 may be formulated and configured to retain the nozzle 102 in the nozzle port 130 upon heating the shape memory material 152 to a predetermined second temperature. In some embodiments, the predetermined second temperature may be greater than the second phase transition temperature, such as the second, higher temperature ($A_f$) when the shape memory material 152 comprises a metal alloy. Upon heating, the shape memory material 152 may transition to the second phase. Upon transformation to the second phase, the force 162 may be applied and the nozzle 102 retained in the nozzle port 130. In other embodiments, the predetermined second temperature may be less than the second phase transition temperature, such as between the first, lower temperature ($A_s$) and the second, higher temperature ($A_f$) when the shape memory material 152 comprises a metal alloy. Upon heating, the shape memory material 152 may transition in part to the second phase such that the first phase and the second phase may each be exhibited in the crystal structure of the shape memory material 152. The transition may be sufficient to apply force 162 and retain the nozzle 102 in the nozzle port 130. The shape memory material 152 exhibiting a one-way shape memory effect may be configured to release the nozzle 102 upon overcooling the shape memory material 152, such as cooling the shape memory material 152 below the second, lower temperature ($M_f$) when the shape memory material 152 comprises a metal alloy and/or below ambient temperature. In other embodiments, external mechanical forces may be used to remove the shape memory material 152 from the nozzle port 130 and release the nozzle 102.

Figure 6:
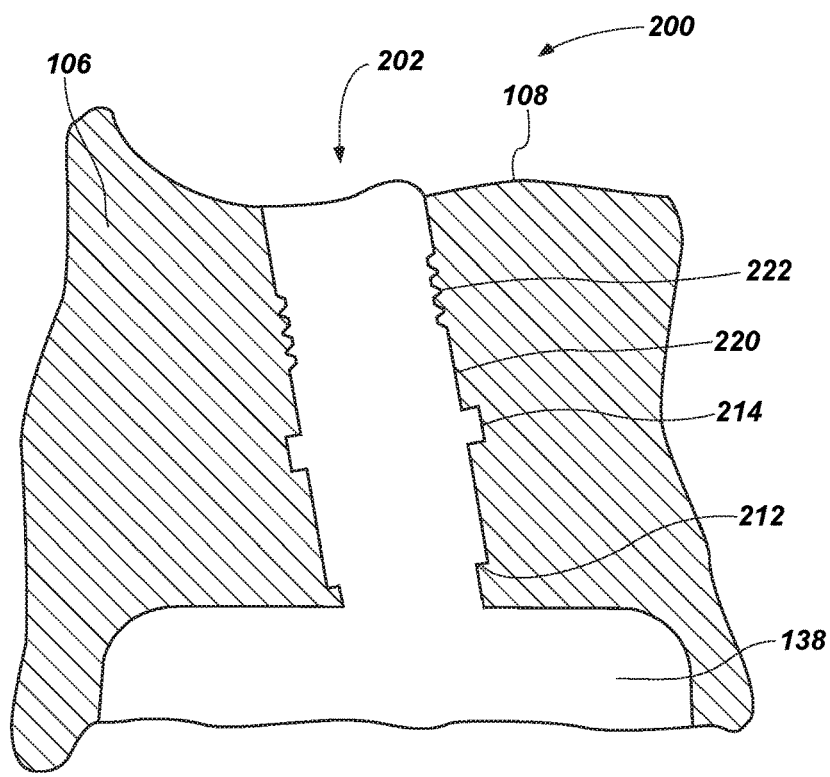
FIG. 6 illustrates a cross-sectional side view of a nozzle port according to an embodiment of the present disclosure.
Figure 7:
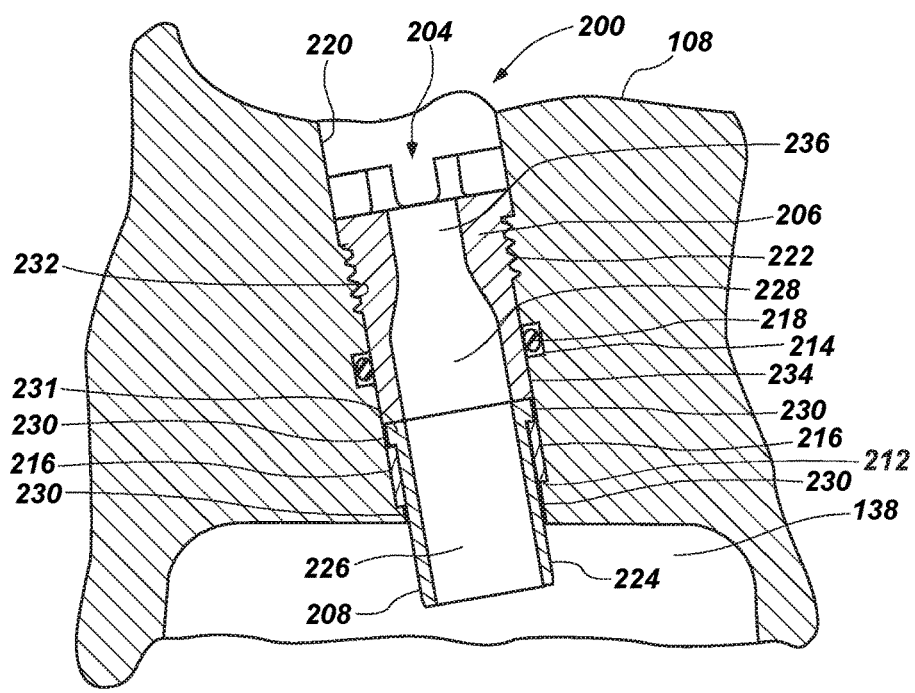
FIG. 7 illustrates a cross-sectional side view of a nozzle and a fluid inlet port sleeve retained in the nozzle port of FIG. 6 using a shape memory material.

FIG. 6 illustrates a cross-sectional view of a nozzle port 200 according to some embodiments of the present disclosure. The nozzle port 200 may be defined by an aperture 202 in the tool body 106. The nozzle port 200 may extend between an internal fluid plenum 138 within the tool body 106 and the external surface 108 of the tool body 106. The nozzle port 200 may be sized and configured to receive components such as a nozzle assembly 204, including a nozzle 206 and a fluid inlet tube 208 (FIG. 7). The nozzle port 200 may comprise within its circumference a seat 212 and a seal groove 214. The seat 212 provides a stop for insertion of a shape memory material 216 (FIG. 7) at a predetermined depth within the tool body 106. The seal groove 214 may be configured to receive a seal 218 therein (FIG. 7). A portion of an inner surface 220 of the tool body 106 within the nozzle port 200 may comprise internal threading 222 configured to retain the nozzle 206 in the nozzle port 200 (FIG. 7). Another portion of the inner surface 200 of the tool body 106 within the nozzle port 200 may lack threading.

FIG. 7 illustrates a cross-sectional view of the shape memory material 216 in the second phase disposed between an outer side surface 224 of the fluid inlet tube 208 and the inner surface 220 of the tool body 106 within the nozzle port 200 of FIG. 6. The fluid inlet tube 208 may comprise a substantially cylindrical outer side surface 224 and an internal passageway or bore 226 through which drilling fluid flows from the internal fluid plenum 138 and to the internal passageway or bore 228 of the nozzle 206. The fluid inlet tube 208 may be removably disposed and retained in the nozzle port 200 by a threadless connection. The threadless connection may comprise mechanical interference between the outer side surface 224 of the fluid inlet tube 208, the inner surface 220 of the tool body 106 within the nozzle port 200, and the shape memory material 216. The shape memory material 216 may be disposed into the nozzle port 200 against the seat 212 prior to insertion of the fluid inlet tube 208. In some embodiments, a sealant 230 may be provided on the inner surface 220 of the tool body 106 within the nozzle port 200 below the seat 212 prior to insertion of the shape memory material 216 and the fluid inlet tube 208. Sealant 230 may be provided between the inner surface 220 of the nozzle port 200 and the outer side surface 224 of the fluid inlet tube 208 proximate to the flange 231 in addition to or in lieu of sealant 230 provided below the seat 212. The sealant 230 may be formulated and configured to prevent drilling fluid flow between the inner surface 220 of the nozzle port 200 and the outer side surface 224 of the fluid inlet tube 208. The sealant 230 may be provided in liquid form, such as a paste or the like, or in solid form, such as an O-ring or the like. In other embodiments, the sealant 230 may be omitted as the shape memory material 216 may be formulated and configured to prevent drilling fluid flow between the inner surface 220 of the nozzle port 200 and the outer side surface 224 of the fluid inlet tube 208.

The shape memory material 216 may be in the form of an annular sleeve and may concentrically surround the fluid inlet tube 208. In other embodiments, the shape memory material 216 may be in the form of an annular ring and at least one annular ring of shape memory material 216 may concentrically surround the fluid inlet tube 208. The shape memory material 216 may be as described above with respect to FIGS. 2 through 5B. That is, the shape memory material 216 may be a material trained to exhibit a two-way shape memory effect such that the shape memory material 216 may be disposed in the nozzle port 200 in the first phase and in a first size and/or shape in some embodiments. Upon heating the shape memory material 216 to a predetermined second phase transition temperature, such as the second, higher temperature ($A_f$), the shape memory material 216 may transition to the second phase and the second size and/or shape to retain the fluid inlet tube 208 in the nozzle port 200 by the threadless connection. Upon cooling the shape memory material 216 to a predetermined first phase transition temperature, such as the first, lower temperature ($M_f$), the shape memory material 216 may transition to the first phase and the first size and/or shape to release the fluid inlet tube 208.

In other embodiments, the shape memory material 216 may be a material exhibiting a one-way shape memory effect. The shape memory material 216 may be disposed in the nozzle port 200 in the first phase and in a first size and/or shape. Upon heating the shape memory material 216 to the second predetermined temperature, such as below or above the second phase transition temperature, the shape memory material 216 may transition in whole or in part to the second phase and the second size and/or shape to retain the fluid inlet tube 208 in the nozzle port 200 by the threadless connection. Upon cooling the shape memory material 216 below the first phase transition temperature and/or below ambient temperature, the shape memory material 216 may release the fluid inlet tube 208 without returning to the first size and/or shape.

The nozzle 206 may be removably inserted into and retained in the nozzle port 200 by a threaded connection between internal threading 222 of the nozzle port 200 and external threading 232 on a portion of an outer side surface 234 of the nozzle 206. The nozzle 206 may comprise a substantially cylindrical outer side surface 234 and an internal passageway or bore 228 through which drilling fluid flows from the bore 226 of the fluid inlet tube 208 and through bore 228 to nozzle orifice 236. A seal 218, such as an O-ring seal, may be provided in the seal groove 214 and may be sized and configured to be compressed between an outer wall of the annular seal groove 214 and the outer side surface 234 of the nozzle 206 to substantially prevent drilling fluid flow between the nozzle 206 and the inner surface 220 of the tool body 106, while the fluid flows through the nozzle 206.

Figure 8:
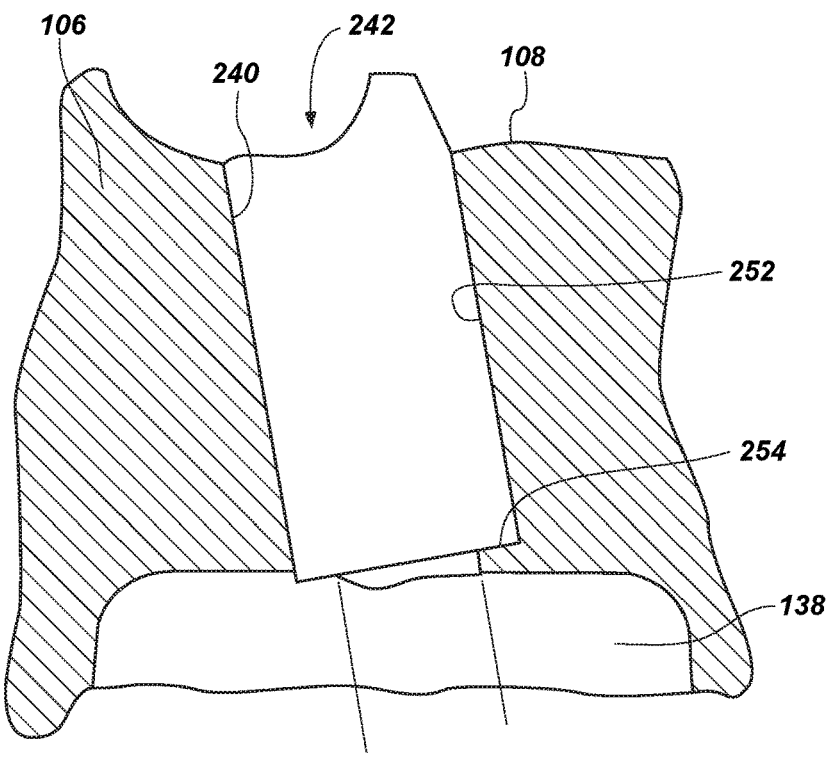
FIG. 8 illustrates a cross-sectional side view of a nozzle port according to an embodiment of the present disclosure.

FIG. 8 illustrates a nozzle port 240 according to some embodiments of the present disclosure. The nozzle port 240 may be defined by an aperture 242 in the tool body 106. The nozzle port 240 may extend between an internal fluid plenum 138 within the tool body 106 and the external surface 108 of the tool body 106. The nozzle port 240 may be sized and configured to receive a nozzle assembly 244, 301, 311 (FIGS. 9, 11, and 12) therein. The nozzle port 240 may lack a threaded portion on an inner surface 252 of the tool body 106 within the nozzle port 240. The nozzle port 240 may comprise a smaller counterbore at the lower end thereof proximate to the internal fluid plenum 138 and bounded by an annular shoulder 254. The annular shoulder 254 may provide a stop for insertion of a nozzle sleeve 250 (FIG. 9) at a predetermined depth within the tool body 106. The counterbore may be configured to allow for insertion of a portion of the fluid inlet tube 248 into the internal fluid plenum 138.

Figure 9:
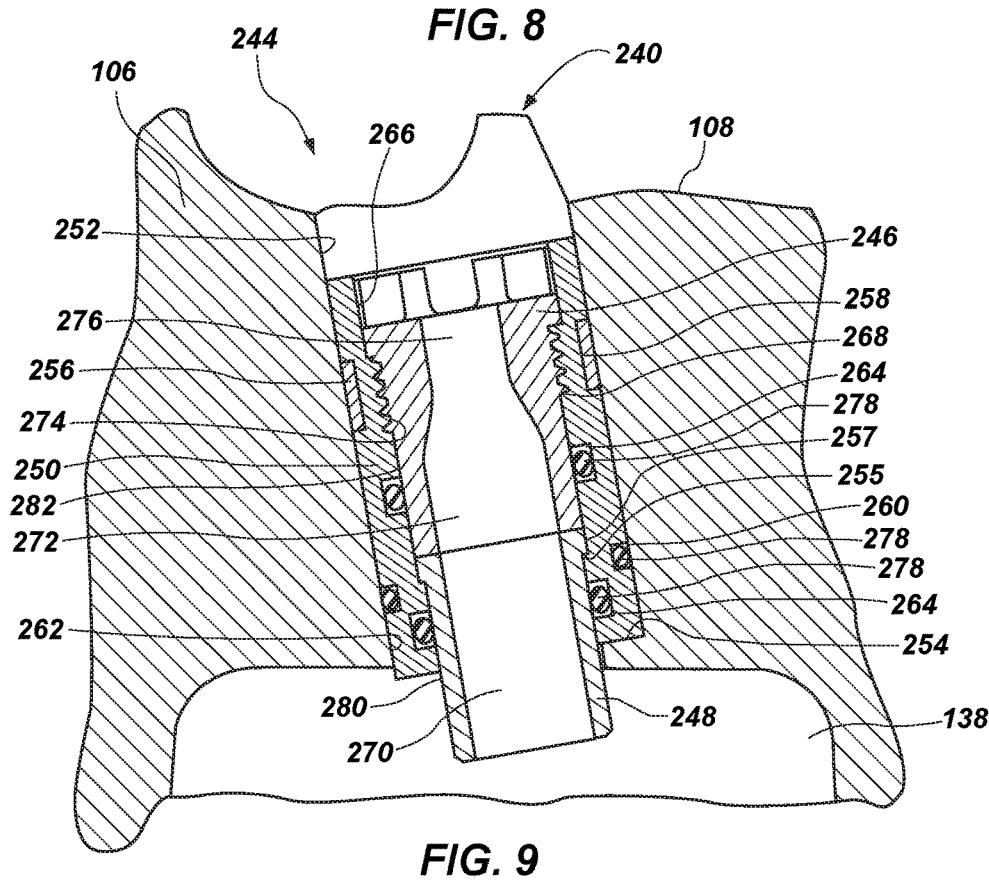
FIG. 9 illustrates a cross-sectional side view of a nozzle assembly including a nozzle sleeve retained in the nozzle port of FIG. 8 using a shape memory material.

FIG. 9 illustrates a nozzle assembly 244, including a nozzle sleeve 250, a nozzle 246, a fluid inlet tube 248, and a shape memory material 256 disposed in the nozzle port 240 of FIG. 8 according to some embodiments of the present disclosure. The nozzle sleeve 250 may comprise a circumferential groove 258 and a circumferential seal groove 260 formed in an outer side surface 262 thereof and at least one annular seal groove 264 formed in an inner side surface 266 thereof. The nozzle sleeve 250 may comprise internal threading 268 on the inner side surface 266 thereof configured to provide a threaded connection for the nozzle 246. A counterbore may be formed intermediately along the length of the nozzle sleeve 250 and may be bounded by an annular shoulder 255. The annular shoulder 255 may provide a stop for insertion of the fluid inlet tube 248 at a predetermined depth within the nozzle sleeve 250. An annular flange 257 of the fluid inlet tube 248 may be supported on the annular shoulder 255 when disposed in the nozzle sleeve 250. The fluid inlet tube 248 may comprise an internal passageway or bore 270 through which drilling fluid flows from an internal fluid plenum 138 to an internal passageway or bore 272 of the nozzle 246. The nozzle 246 may comprise a substantially cylindrical outer side surface 282 having external threading 274 on a portion thereof and a nozzle orifice 276 through which drilling fluid flows from the bore 270 of the fluid inlet tube 248.

Seals 278, such as O-ring seals, may be provided in the annular seal grooves 264 and may be sized and configured to be compressed between an outer wall of the annular seal grooves 264 and at least one of the outer side surface 282 of the nozzle 246 or the outer side surface 280 of the fluid inlet tube 248. The seal 278, such as an O-ring seal, may be provided in the circumferential seal groove 260 and may be sized and configured to be compressed between an inner side wall of the circumferential seal groove 260 and the inner surface 252 of the tool body 106 within the nozzle port 240 to substantially prevent drilling fluid flow between the nozzle sleeve 250 and the inner surface 252 of the tool body 106. In some embodiments, the shape memory material 256 may be provided in the circumferential seal groove 260 in lieu of the seal 278. The shape memory material 256 may be formulated and configured to provide a threadless connection between the inner side wall of the circumferential seal groove 260 and the inner surface 252 of the tool body 106 within the nozzle port 240 to retain the nozzle sleeve 250 therein. In other embodiments, the shape memory material 256 provided in the circumferential seal groove 260 may be provided in lieu of the shape memory material 256 provided in the circumferential groove 258. In such embodiments, the seal 278 may be provided in the circumferential groove 258 to prevent drilling fluid flow between the nozzle sleeve 250 and the inner surface 252 of the tool body 106.

The shape memory material 256 may be disposed in the circumferential groove 258 in the outer side surface 262 of the nozzle sleeve 250 prior to insertion of the nozzle sleeve 250 in the nozzle port 240. The shape memory material 256 may be in the form of an annular sleeve and may concentrically surround the nozzle sleeve 250. In other embodiments, the shape memory material 256 may be in the form of an annular ring and at least one annular ring of shape memory material 256 may concentrically surround the nozzle sleeve 250.

The shape memory material 256 may be as described above with respect to FIGS. 2 through 5B. That is, the shape memory material 256 may be a material trained to exhibit a two-way shape memory effect in some embodiments. The shape memory material 256 may be disposed in the nozzle port 240 in a first phase and in a first size and/or shape. Upon heating to a predetermined second phase transition temperature, the shape memory material 256 may be formulated and configured to transform to a second phase and a second size and/or shape upon heating to retain the nozzle sleeve 250 in the nozzle port 240 by a threadless connection. The threadless connection may comprise mechanical interference between the outer side surface 262 of the nozzle sleeve 250, the inner surface 252 of the tool body 106 within the nozzle port 240, and the shape memory material 256. Upon cooling to a predetermined first phase transition temperature, the shape memory material 256 may be formulated and configured to transform to the first phase and the first size and/or shape to release and remove the nozzle sleeve 250.

In other embodiments, the shape memory material 256 may be a material exhibiting a one-way shape memory effect. The shape memory material 256 may be disposed in the nozzle port 240 in the first phase and in a first size and/or shape. Upon heating the shape memory material 256 to the second predetermined temperature, such as below or above the second phase transition temperature, the shape memory material 256 may transition in whole or in part to the second phase and the second size and/or shape to retain the nozzle sleeve 250 in the nozzle port 240 by the threadless connection. Upon cooling the shape memory material 256 below the first phase transition temperature and/or below ambient temperature, the shape memory material 256 may release the nozzle sleeve 250 without returning to the first size and/or shape.

Figure 10:
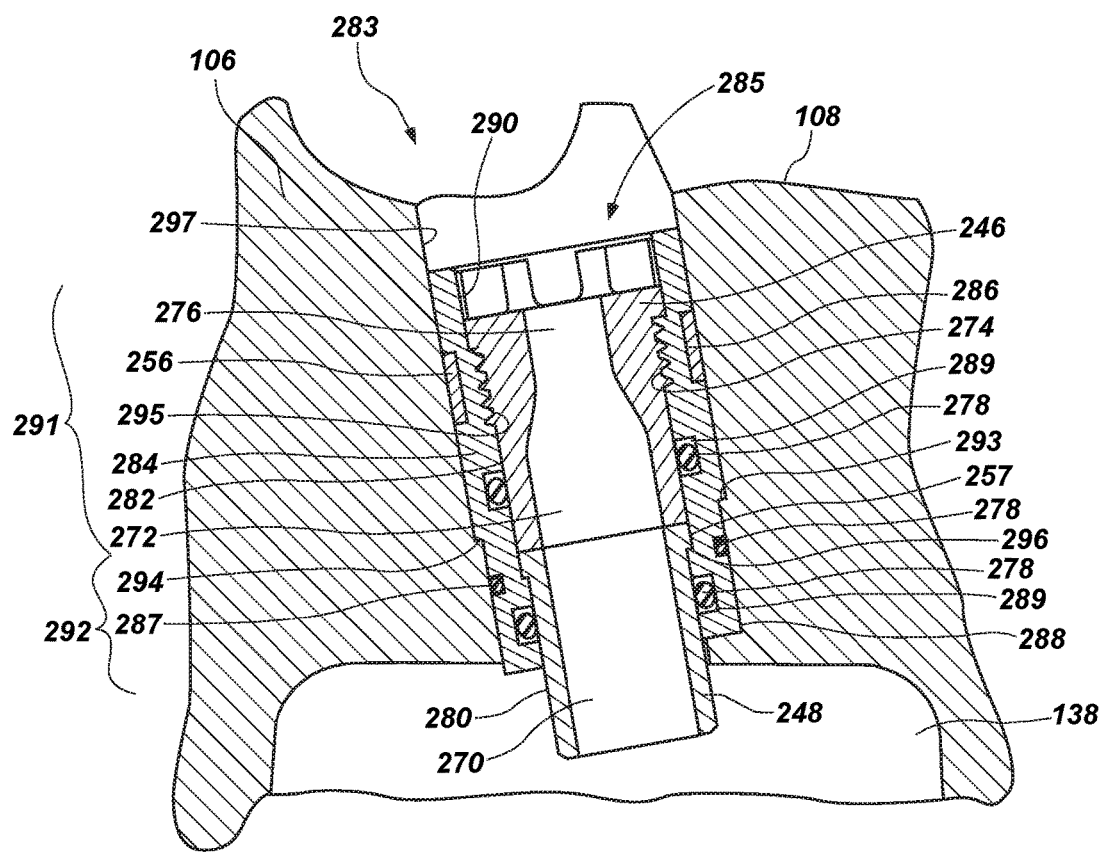
FIG. 10 illustrates a cross-sectional side view of a nozzle assembly including a nozzle sleeve retained in a nozzle port using a shape memory material.

FIG. 10 illustrates a nozzle assembly 283 including a nozzle sleeve 284, the nozzle 246, the fluid inlet tube 248, and the shape memory material 256 disposed in a nozzle port 285 according to some embodiments of the present disclosure. The nozzle sleeve 284 may comprise a circumferential groove 286 and a circumferential seal groove 287 formed in an outer side surface 288 thereof and at least one annular seal groove 289 formed in an inner side surface 290 thereof. The outer side surface 288 may comprise an upper portion 291 and a lower portion 292. An outer diameter of the upper portion 291 may be greater than an outer diameter of the lower portion 292. The transition between the upper portion 291 and the lower portion 292 may be defined by a step 293. The step 293 may be configured to protect the seal 278 provided in the at least annular seal groove 289 during assembly or disassembly of the nozzle assembly 283 in the nozzle port 285. To accommodate installation of the nozzle sleeve 284 in the nozzle port 285, the nozzle port 285 may comprise a counterbore bounded by an annular shoulder 294 configured to provide a stop for insertion of the nozzle sleeve 284 at a predetermined depth within the nozzle port 285. The step 293 may abut against the annular shoulder 294 upon insertion of the nozzle sleeve 284 within the nozzle port 285. The nozzle sleeve 284 may comprise internal threading 295 on the inner side surface 290 thereof configured to provide a threaded connection for the nozzle 246. A counterbore also may be formed in the lower portion 292 of the nozzle sleeve 284 and may be bounded by an annular shoulder 296. The annular shoulder 296 may provide a stop for insertion of the fluid inlet tube 248 at a predetermined depth within the nozzle sleeve 284. An annular flange 257 of the fluid inlet tube 248 may be supported by the annular shoulder 296 when disposed in the nozzle sleeve 284. Seals 278, such as O-ring seals, may be provided in the annular seal grooves 289 and may be sized and configured to be compressed between an outer wall of the annular seal grooves 289 and at least one of the outer side surface 282 of the nozzle 246 or the outer side surface 280 of the fluid inlet tube 248. The seal 278, such as an O-ring seal, may be provided in the circumferential seal groove 287 and may be sized and configured to be compressed between an inner side wall of the circumferential seal groove 287 and an inner surface 297 of the tool body 106 within the nozzle port 285 to substantially prevent drilling fluid flow between the nozzle sleeve 284 and the inner surface 297 of the tool body 106. The nozzle sleeve 284 may be retained in the nozzle port 285 by the shape memory material 256 and the threadless connection as described with reference to FIG. 9.

Figure 11:
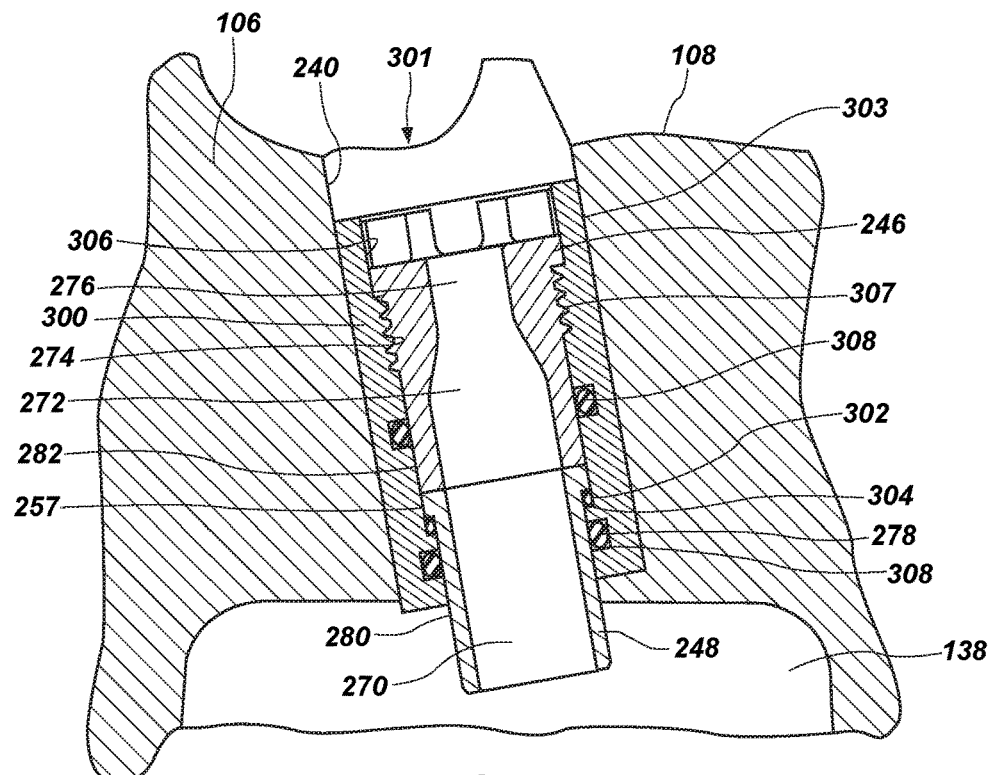
FIG. 11 illustrates a cross-sectional side view of a nozzle assembly including a fluid inlet tube retained in a nozzle sleeve using a shape memory material.

FIG. 11 illustrates a nozzle assembly 301 including a nozzle sleeve 300, the nozzle 246, the fluid inlet tube 248, and a shape memory material 302 disposed in the nozzle port 240 of FIG. 8. The nozzle sleeve 300 may comprise internal threading 307 on a portion of the inner side surface 306 thereof configured to provide a threaded connection for the nozzle 246. The nozzle sleeve 300 may comprise a counterbore formed intermediately along the length of the nozzle sleeve 300. The counterbore may be bounded by an annular shoulder 304 configured to provide a stop for insertion of the shape memory material 302 and the fluid inlet tube 248 at a predetermined depth within the nozzle sleeve 300. Seals 278 may be provided in annular seal grooves 308 formed in the inner side surface 306 of the nozzle sleeve 300. In some embodiments, the nozzle sleeve 300 may comprise a circumferential groove formed in an outer side surface 303 thereof, such as the circumferential groove 258 of FIG. 9 including the shape memory material 256 formulated and configured to retain the nozzle sleeve 300 in the nozzle port 240 as described with reference to FIG. 9.

The shape memory material 302 in the first phase may be disposed on the annular shoulder 304 prior to insertion of the fluid inlet tube 248. Upon insertion of the fluid inlet tube 248, the shape memory material 302 may be disposed between an inner side surface 306 of the nozzle sleeve 300 and the outer side surface 280 of the fluid inlet tube 248. The shape memory material 302 may be configured as an annular ring and may concentrically surround the fluid inlet tube 248. The shape memory material 302 may be as described above with respect to FIGS. 2 through 5B. That is, the shape memory material 302 may be trained to exhibit a two-way shape memory effect such that the shape memory material 302 may be disposed in the nozzle port 240 in a first phase and in a first size and/or shape. Upon heating to a predetermined second phase transition temperature, the shape memory material 302 may be formulated and configured to transform to a second phase and a second size and/or shape upon heating upon heating to retain the fluid inlet tube 248 in the nozzle sleeve 300 by a threadless connection. The threadless connection may comprise mechanical interference between an inner side surface 306 of the nozzle sleeve 300, the outer side surface 280 of the fluid inlet tube 248, and the shape memory material 302. Upon cooling to a predetermined first phase transition temperature, the shape memory material 302 may be formulated and configured to transform to the first phase and the first size and/or shape to release and remove the fluid inlet tube 248. In other embodiments, the shape memory material 302 may be a material exhibiting a one-way shape memory effect. The shape memory material 302 may be disposed in the nozzle sleeve 300 in the first phase and in a first size and/or shape. Upon heating to a predetermined second temperature, such as below or above the second phase transition temperature, the shape memory material 302 may transition in whole or in part to the second phase and the second size and/or shape to retain the fluid inlet tube 248 in the nozzle sleeve 300 by the threadless connection. Upon cooling the shape memory material 302 below the first phase transition temperature and/or below ambient temperature, the shape memory material 302 may release the fluid inlet tube 248 without returning to the first size and/or shape.

Figure 12:
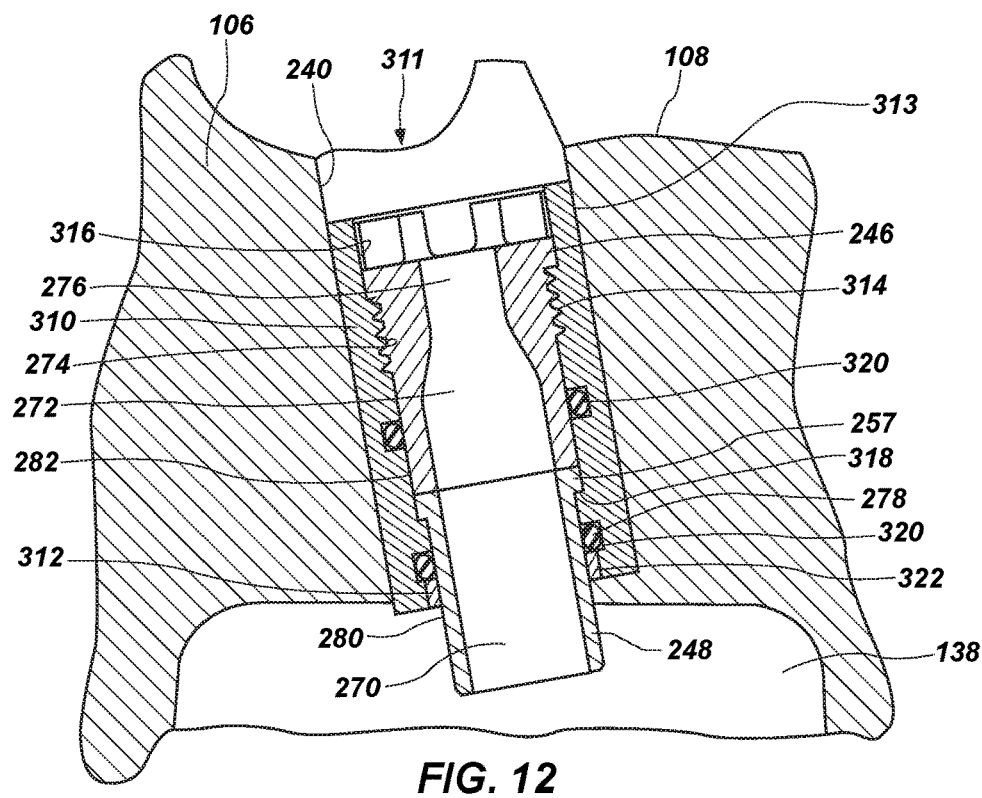
FIG. 12 illustrates a cross-sectional side view of a nozzle assembly including a fluid inlet tube retained in a nozzle sleeve using a shape memory material.

FIG. 12 illustrates a nozzle assembly 311, including a nozzle sleeve 310, the nozzle 246, the fluid inlet tube 248, and a shape memory material 312 disposed in the nozzle port 240 of FIG. 8. The nozzle sleeve 310 may comprise internal threading 314 on a portion of the inner side surface 316 thereof configured to provide a threaded connection for the nozzle 246. The nozzle sleeve 310 may comprise a counterbore formed intermediately along the length thereof. The counterbore may be bounded by an annular shoulder 318 configured to provide a stop for insertion of the fluid inlet tube 248 at a predetermined depth within the nozzle sleeve 310. The nozzle sleeve 310 may comprise at least one annular seal groove 320 and an annular shape memory material groove 322 in the inner side surface 316 thereof. Seals 278 may be provided in the annular seal grooves 320. In some embodiments, the nozzle sleeve 310 may comprise a circumferential groove formed in an outer side surface 313 thereof, such as the circumferential groove 258 of FIG. 9 including the shape memory material 256 formulated and configured to retain the nozzle sleeve 310 in the nozzle port 240 by the threadless connection.

The shape memory material 312 may be disposed in the annular shape memory material groove 322 prior to insertion of the fluid inlet tube 248. Upon insertion of the fluid inlet tube 248, the shape memory material 312 may be disposed between an inner side surface 316 of the nozzle sleeve 310 and the outer side surface 280 of the fluid inlet tube 248. The shape memory material 312 may be configured as an annular sleeve and may concentrically surround the fluid inlet tube 248. In other embodiments, the shape memory material 312 may be configured as an annular ring and at least one annular ring may be provided in the annular shape memory material groove 322. The shape memory material 312 may be as described above with respect to FIGS. 2 through 5B. That is, the shape memory material 312 may be trained to exhibit a two-way shape memory effect such that the shape memory material 312 may be disposed in the nozzle port 240 in a first phase and in a first size and/or shape in some embodiments. Upon heating to a predetermined second phase transition temperature, the shape memory material 312 may be formulated and configured to transform to a second phase and a second size and/or shape to retain the fluid inlet tube 248 in the nozzle sleeve 310 by a threadless connection. The threadless connection may comprise mechanical interference between an inner side surface 316 of the nozzle sleeve 310, the outer side surface 280 of the fluid inlet tube 248, and the shape memory material 312. Upon cooling to a predetermined first phase transition temperature, the shape memory material 312 may be formulated and configured to transform to the first phase and the first size and/or shape upon cooling to release the fluid inlet tube 248. In other embodiments, the shape memory material 312 may be a material exhibiting a one-way shape memory effect. The shape memory material 312 may be disposed in the nozzle sleeve 310 in the first phase and in a first size and/or shape. Upon heating to a predetermined second temperature, such as between a first phase transition temperature and a second phase transition temperature or above the second phase transition temperature, the shape memory material 312 may transition in whole or in part to the second phase and the second size and/or shape to retain the fluid inlet tube 248 in the nozzle sleeve 310 by the threadless connection. Upon cooling the shape memory material 312 below the first phase transition temperature and/or below ambient temperature, the shape memory material 312 may release the fluid inlet tube 248 without returning the first size and/or shape.

Figure 13:
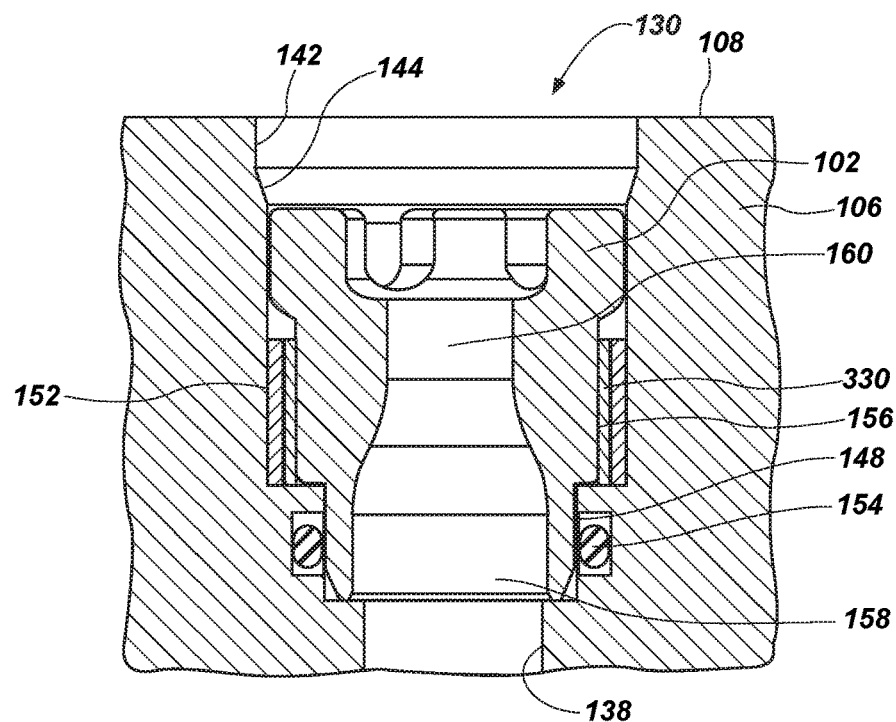
FIG. 13 illustrates a cross-sectional side view of a nozzle, a shape memory material in a first phase, and a filler material in the nozzle port of FIG. 2.
Figure 14:
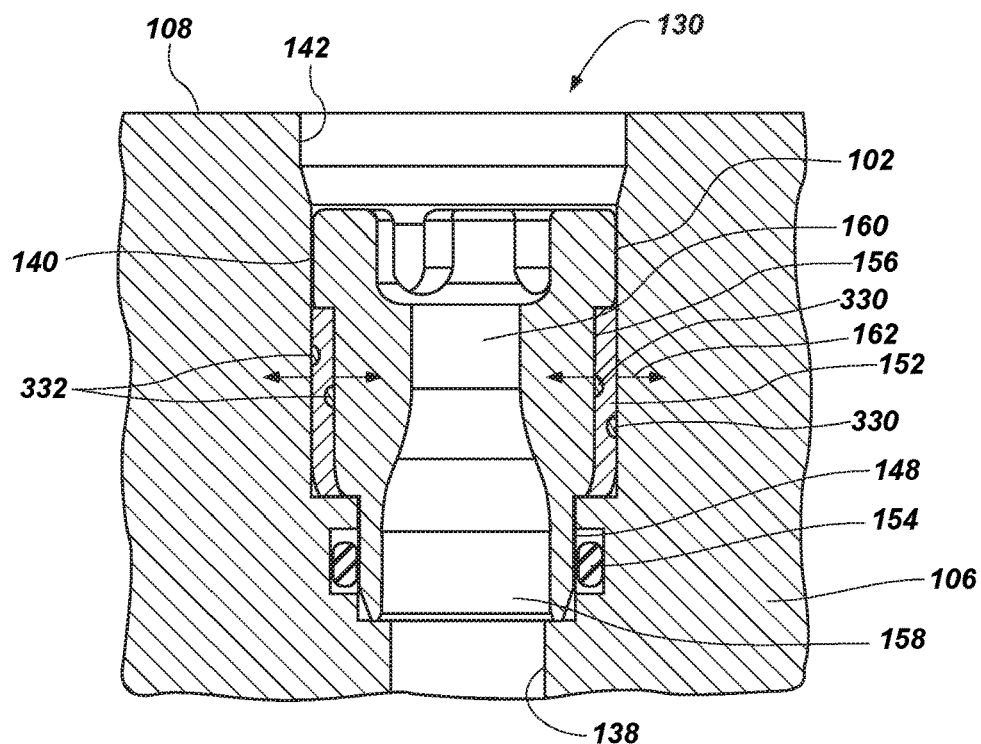
FIG. 14 illustrates a cross-sectional side view of a nozzle retained in the nozzle port of FIG. 2 using a shape memory material and a filler material.

FIGS. 13 and 14 illustrate an embodiment in which the nozzle 102 may be retained in the nozzle port 130 (FIG. 2) using a shape memory material 152 and a filler material 330. The filler material 330 may be disposed adjacent the shape memory material 152 and may be configured to at least substantially fill a cavity 332 between the shape memory material 152 in the second phase and at least one of the nozzle 102 or the inner surface 140 of the tool body 106 within the nozzle port 130. In some embodiments, the filler material 330 may be formulated and configured to provide a threadless connection in addition to the threadless connection provided by the shape memory material 152. The filler material 330 may substantially fill the space provided between the outer side surface 156 of the nozzle 102 and the inner surface 140 of the tool body 106 in the nozzle port 130. The shape memory material 152 may be in the form of a wire or a pad provided against a portion of the outer side surface 156 of the nozzle 102 and configured to partially surround rather than concentrically surround the nozzle 102.

The filler material 330 may be a material having a melting point less than a predetermined second phase transition temperature of the shape memory material 152, such as an austenitic phase transition temperature when the shape memory material 152 comprises a metal alloy. In some embodiments, the filler material 330 may be a material having a melting point below about 300° C., such as a low-temperature alloy. In other embodiments, the filler material 330 may comprise one or more of metals such as bismuth, antimony, or tin, which may be commercially pure or mixed with other elements. For example, the filler material 330 may comprise a Sn-based alloy, a Pb-based alloy, an In-based alloy, a Cd-based alloy, a Bi-based alloy or an Sb-based alloy. The filler material 330 may comprise a solder material, such as a metal alloy conventionally used to fuse metal objects. In other embodiments, the filler material 330 may include a polymeric material (e.g., an epoxy, a thermoset, etc.). The filler material 330 may be formulated to deform to at least substantially fill a cavity between the shape memory material 152 in the second phase and at least one of the nozzle 102 or the inner surface 140 of the tool body 106 within the nozzle port 130 so as to improve contact between the components. Thus, a filler material 330 may decrease stress concentrations due to surface roughness or a mismatch between shapes of adjacent components. The use of a filler material 330 may allow components of the nozzle 102 (including the shape memory material 152) to be manufactured with wider tolerance ranges. A filler material 330 may also provide a damping capability to protect the nozzle 102. In some embodiments, the filler material 330 may comprise more than one type of material, or more than one body, depending on the design of the nozzle port 130, the nozzle 102, and the shape memory material 152.

The filler material 330 may be disposed adjacent to the shape memory material 152 in the first phase in solid or liquid form. For example, the filler material 330 may be inserted as a ring, a sheet, a powder, a paste, or another solid form. In other embodiments, the filler material 330 may be melted, and the molten filler material 330 may be wicked between the shape memory material 152 and one or more components of the nozzle 102. Filler materials may also be used in the embodiments shown in FIGS. 7 and 9 through 11.

Additional non-limiting example embodiments of the disclosure are described below.

Embodiment 1

An earth-boring tool for use in forming a wellbore within a subterranean formation comprising a tool body having an aperture therein defining a nozzle port, a nozzle or nozzle assembly disposed in the nozzle port, and at least one shape memory material disposed adjacent a surface of at least one component of the nozzle or nozzle assembly and retaining the at least one component in position on the earth-boring tool by a threadless connection. The nozzle port extends between an internal fluid plenum within the tool body and an external surface of the tool body. The threadless connection comprises mechanical interference between the at least one shape memory material, the at least one component of the nozzle or nozzle assembly, and the tool body or another component of the nozzle or nozzle assembly.

Embodiment 2

The earth-boring tool of Embodiment 1, wherein the at least one shape memory material is trained to exhibit a two-way shape memory effect.

Embodiment 3

The earth-boring tool of Embodiment 1, wherein the at least one shape memory material exhibits a one-way shape memory effect.

Embodiment 4

The earth-boring tool of any of Embodiments 1 through 3, wherein the at least one shape memory material is formulated and configured to release the at least one component of the nozzle or nozzle assembly upon cooling the at least one shape memory material to a predetermined temperature.

Embodiment 5

The earth-boring tool of any of Embodiments 1 through 4, wherein the at least one shape memory material comprises a metal alloy.

Embodiment 6

The earth-boring tool of any of Embodiments 1 through 4, wherein the at least one shape memory material comprises a polymer.

Embodiment 7

The earth-boring tool of any of Embodiments 1 through 6, wherein the at least one shape memory material concentrically surrounds the at least one component of the nozzle or nozzle assembly.

Embodiment 8

The earth-boring tool of any of Embodiments 1 through 7, wherein the nozzle or nozzle assembly comprises a nozzle, and wherein the at least one shape memory material comprises an annular sleeve disposed between an inner surface of the tool body within the nozzle port and an outer side surface of the nozzle.

Embodiment 9

The earth-boring tool of any of Embodiments 1 through 7, wherein the nozzle or nozzle assembly comprises a nozzle assembly including a nozzle and a fluid inlet tube, and wherein the at least one shape memory material comprises an annular sleeve disposed between an inner surface of the tool body within the nozzle port and an outer side surface of the fluid inlet tube.

Embodiment 10

The earth-boring tool of any of Embodiments 1 through 7, wherein the nozzle or nozzle assembly comprises a nozzle assembly including a nozzle sleeve, a nozzle, and a fluid inlet tube, and wherein the at least one shape memory material comprises at least one annular ring disposed between an inner side surface of the nozzle sleeve and an outer side surface of the fluid inlet tube.

Embodiment 11

The earth-boring tool of any of Embodiments 1 through 7, wherein the nozzle or nozzle assembly comprises a nozzle assembly including a nozzle sleeve, a nozzle, and a fluid inlet tube, and wherein the at least one shape memory material comprises at least one annular sleeve disposed between an inner side surface of the nozzle sleeve and an outer side surface of the fluid inlet tube.

Embodiment 12

The earth-boring tool of any of Embodiments 1 through 7, wherein the nozzle or nozzle assembly comprises a nozzle assembly including a nozzle sleeve and a nozzle, and wherein the at least one shape memory material comprises an annular sleeve disposed in a circumferential groove formed in an outer side surface of the nozzle sleeve.

Embodiment 13

The earth-boring tool of any of Embodiments 1 through 12, further comprising a filler material disposed adjacent the at least one shape memory material, the filler material configured to at least substantially fill a cavity between the at least one shape memory material and at least one of the at least one component of the nozzle or nozzle assembly, and the tool body or another component of the nozzle or nozzle assembly.

Embodiment 14

The earth-boring tool of Embodiment 13, wherein the at least one shape memory material comprises a metal alloy, and wherein the filler material has a melting point less than an austenitic phase transition temperature of the shape memory material.

Embodiment 15

The earth-boring tool of Embodiment 14, wherein the filler material has a melting point less than about 300° C.

Embodiment 16

The earth-boring tool of any of Embodiments 13 through 15, wherein the filler material comprises at least one of a Sn-based alloy, a Pb-based alloy, an In-based alloy, a Cd-based alloy, a Bi-based alloy or an Sb-based alloy.

Embodiment 17

A method of forming an earth-boring tool for use in forming a wellbore within a subterranean formation, comprising disposing a nozzle or a nozzle assembly in a nozzle port of a tool body of the earth-boring tool; disposing at least one shape memory material adjacent a surface of at least one component of the nozzle or the nozzle assembly; and transforming the at least one shape memory material from a first phase to a second phase by a stimulus. The nozzle port is defined by an aperture in the tool extending between an internal fluid plenum within the tool body and an external surface of the tool body. The at least one shape memory material is formulated and configured to retain at least one component of the nozzle or the nozzle assembly by a threadless connection in the second phase. The threadless connection comprises mechanical interference between the at least one shape memory material, the at least one component of the nozzle or nozzle assembly, and the tool body or another component of the nozzle or nozzle assembly.

Embodiment 18

The method of Embodiment 17, wherein the stimulus comprises at least one of a thermal stimulus, an electrical stimulus, a magnetic stimulus, or a chemical stimulus.

Embodiment 19

The method of Embodiment 17, wherein the stimulus comprises a thermal stimulus, the thermal stimulus comprising heating the at least one shape memory material to a second phase transition temperature.

Embodiment 20

The method of Embodiment 17 or 19, wherein transforming the at least one shape memory material from the first phase to the second phase comprises transforming the at least one shape memory material from a first shape to a second shape and enlarging at least one dimension of the at least one shape memory material.

Embodiment 21

The method of any of Embodiments 17 through 20, further comprising training the at least one shape memory material to exhibit a two-way shape memory effect prior to disposing the at least one shape memory material adjacent the surface of at least one component of the nozzle or the nozzle assembly.

Embodiment 22

The method of Embodiment 21, further comprising transforming the at least one shape memory material from the second phase to the first phase by cooling the at least one shape memory material to a first phase transition temperature and releasing the threadless connection comprising mechanical interference between the at least one shape memory material, the at least one component of the nozzle or nozzle assembly, and the tool body or another component of the nozzle or nozzle assembly.

Embodiment 23

The method of any of Embodiments 17 through 22, further comprising disposing a molten filler material adjacent the at least one shape memory material prior to transforming the at least one shape memory material from the first phase to the second phase by the stimulus, the molten filler material configured to at least substantially fill a cavity between the at least one shape memory material and at least one of the at least one component of the nozzle or nozzle assembly, and the tool body or another component of the nozzle or nozzle assembly.

While the disclosed device structures and methods are susceptible to various modifications and alternative forms in implementation thereof, specific embodiments have been shown by way of example in the drawings and have been described in detail herein. However, it should be understood that the present disclosure is not limited to the particular forms disclosed. Rather, the present invention encompasses all modifications, combinations, equivalents, variations, and alternatives falling within the scope of the present disclosure as defined by the following appended claims and their legal equivalents.

What is claimed is:

1. An earth-boring tool for use in forming a wellbore within a subterranean formation, comprising:
a tool body having an aperture therein defining a nozzle port, the nozzle port extending between an internal fluid plenum within the tool body and an external surface of the tool body;
a nozzle or nozzle assembly disposed in the nozzle port;
at least one shape memory metal alloy disposed adjacent a surface of at least one component of the nozzle or nozzle assembly and retaining the at least one component in position on the earth-boring tool by a threadless connection comprising mechanical interference between the at least one shape metal alloy, the at least one component of the nozzle or nozzle assembly, and the tool body or another component of the nozzle or nozzle assembly; and
a filler material disposed adjacent the at least one shape memory metal alloy and configured to at least substantially fill a cavity between the at least one shape memory metal alloy and at least one of the at least one component of the nozzle or nozzle assembly, and the tool body or another component of the nozzle or nozzle assembly, the filler material having a melting point less than an austenitic phase transition temperature of the shape memory metal alloy.

2. The earth-boring tool of claim 1, wherein the at least one shape memory metal alloy is trained to exhibit a two-way shape memory effect.

3. The earth-boring tool of claim 1, wherein the at least one shape memory metal alloy is formulated and configured to release the at least one component of the nozzle or nozzle assembly upon cooling the shape memory metal alloy to a predetermined temperature.

4. The earth-boring tool of claim 1, wherein the at least one shape memory metal alloy exhibits a one-way shape memory effect.

5. The earth-boring tool of claim 1, wherein the at least one shape memory metal alloy concentrically surrounds the at least one component of the nozzle or nozzle assembly.

6. The earth-boring tool of claim 5, wherein the nozzle or nozzle assembly comprises a nozzle, and wherein the at least one shape memory metal alloy comprises an annular sleeve disposed between an inner surface of the tool body within the nozzle port and an outer side surface of the nozzle.

7. The earth-boring tool of claim 5, wherein the nozzle or nozzle assembly comprises a nozzle assembly including a nozzle and a fluid inlet tube, and wherein the at least one shape memory metal alloy comprises an annular sleeve disposed between an inner surface of the tool body within the nozzle port and an outer side surface of the fluid inlet tube.

8. The earth-boring tool of claim 5, wherein the nozzle or nozzle assembly comprises a nozzle assembly including a nozzle sleeve, a nozzle, and a fluid inlet tube, and wherein the at least one shape memory metal alloy comprises at least one annular ring disposed between an inner side surface of the nozzle sleeve and an outer side surface of the fluid inlet tube.

9. The earth-boring tool of claim 5, wherein the nozzle or nozzle assembly comprises a nozzle assembly including a nozzle sleeve and a nozzle, and wherein the at least one shape memory metal alloy comprises an annular sleeve disposed in a circumferential groove formed in an outer side surface of the nozzle sleeve.

10. The earth-boring tool of claim 1, wherein the filler material has a melting point less than about 300° C.

11. The earth-boring tool of claim 1, wherein the filler material comprises at least one of a Sn-based alloy, a Pb-based alloy, an In-based alloy, a Cd-based alloy, a Bi-based alloy or an Sb-based alloy.

12. A method of forming an earth-boring tool for use in forming a wellbore within a subterranean formation, comprising:
    disposing a nozzle or a nozzle assembly in a nozzle port of a tool body of the earth-boring tool, the nozzle port defined by an aperture in the tool body extending between an internal fluid plenum within the tool body and an external surface of the tool body;
    disposing at least one shape memory material adjacent a surface of at least one component of the nozzle or the nozzle assembly;
    disposing a molten filler material adjacent the at least one shape memory material; and
    transforming the at least one shape memory material from a first phase to a second phase by application of a stimulus, wherein the at least one shape memory material is formulated and configured to retain at least one component of the nozzle or the nozzle assembly by a threadless connection in the second phase, the threadless connection comprising mechanical interference between the at least one shape memory material, the at least one component of the nozzle or nozzle assembly, and the tool body or another component of the nozzle or nozzle assembly, the molten filler material at least substantially filling a cavity between the at least one shape memory material in the second phase and at least one of the at least one component of the nozzle or nozzle assembly, and the tool body or another component of the nozzle or nozzle assembly.

13. The method of claim 12, wherein the stimulus comprises at least one of a thermal stimulus, an electrical stimulus, a magnetic stimulus, or a chemical stimulus.

14. The method of claim 12, wherein transforming the at least one shape memory material from the first phase to the second phase comprises transforming the at least one shape memory material from a first shape to a second shape and enlarging at least one dimension of the at least one shape memory material.

15. The method of claim 12, further comprising training the at least one shape memory material to exhibit a two-way shape memory effect prior to disposing the at least one shape memory material adjacent the surface of at least one component of the nozzle or the nozzle assembly.

16. The method of claim 15, further comprising transforming the at least one shape memory material from the second phase to the first phase by cooling the at least one shape memory material to a first phase transition temperature and releasing the threadless connection between the at least one shape memory material, the at least one component of the nozzle or nozzle assembly, and the tool body or another component of the nozzle or nozzle assembly.

17. The method of claim 12, wherein the filler material has a melting point less than a transition temperature of the second phase of the at least one shape memory material.

18. The method of claim 12, wherein the at least one shape memory material comprises a shape memory metal alloy.

19. The method of claim 12, wherein the filler material is formulated and configured to retain the at least one component in position on the earth-boring tool by a threadless connection comprising mechanical interference between the filler material, the shape memory material, the at least one component of the nozzle or nozzle assembly, and the tool body or another component of the nozzle or nozzle assembly.

20. The earth-boring tool of claim 1, wherein the filler material is formulated and configured to retain the at least one component in position on the earth-boring tool by a threadless connection comprising mechanical interference between the filler material, the shape memory metal alloy, the at least one component of the nozzle or nozzle assembly, and the tool body or another component of the nozzle or nozzle assembly.

* * * * *

UNITED STATES PATENT AND TRADEMARK OFFICE
CERTIFICATE OF CORRECTION

PATENT NO. : 10,053,916 B2  
APPLICATION NO. : 15/002189  
DATED : August 21, 2018  
INVENTOR(S) : Bo Yu et al.

Page 1 of 1

It is certified that error appears in the above-identified patent and that said Letters Patent is hereby corrected as shown below:

In the Specification

Column 3, Line 22, change "for use in fouling" to --for use in forming--

Signed and Sealed this
Sixteenth Day of October, 2018

Andrei Iancu
*Director of the United States Patent and Trademark Office*